(12) United States Patent
Dodds

(10) Patent No.: US 7,625,135 B2
(45) Date of Patent: Dec. 1, 2009

(54) DUAL CONFIGURATION TRANSCEIVER HOUSING

(75) Inventor: David R. Dodds, Boulder, CO (US)

(73) Assignee: Finisar Corporation, Sunnyvale, CA (US)

( * ) Notice: Subject to any disclaimer, the term of this patent is extended or adjusted under 35 U.S.C. 154(b) by 673 days.

(21) Appl. No.: 10/758,734

(22) Filed: Jan. 16, 2004

(65) Prior Publication Data

US 2005/0158051 A1 Jul. 21, 2005

(51) Int. Cl.
*G02B 6/42* (2006.01)
(52) U.S. Cl. .......................................................... 385/92
(58) Field of Classification Search ........................ None
See application file for complete search history.

(56) References Cited

U.S. PATENT DOCUMENTS

| | | | |
|---|---|---|---|
| 5,901,263 A | 5/1999 | Gaio et al. ...................... 385/92 |
| 6,335,869 B1 | 1/2002 | Branch et al. ................ 361/816 |
| 6,430,053 B1 | 8/2002 | Peterson et al. ............. 361/728 |
| 6,439,918 B1 | 8/2002 | Togami et al. .............. 439/372 |
| 6,494,623 B1 | 12/2002 | Ahrens et al. ................. 385/76 |
| 6,517,382 B2 | 2/2003 | Flickinger et al. ........... 439/607 |
| 6,533,470 B2 | 3/2003 | Ahrens ........................ 385/88 |
| 6,533,603 B1 | 3/2003 | Togami ....................... 439/372 |
| 6,561,854 B2 | 5/2003 | Stockhaus et al. ........... 439/701 |
| 6,570,768 B2 | 5/2003 | Medina ....................... 361/747 |
| 6,612,858 B1 | 9/2003 | Stockhaus ................... 439/352 |
| 6,994,478 B1 * | 2/2006 | Chiu et al. .................... 385/88 |
| 2002/0150344 A1 | 10/2002 | Chiu et al. .................... 385/53 |
| 2003/0059167 A1 | 3/2003 | Chiu et al. .................... 385/53 |
| 2003/0142917 A1 | 7/2003 | Merrick ........................ 385/53 |
| 2003/0156801 A1 | 8/2003 | Hwang ........................ 385/92 |
| 2003/0194190 A1 | 10/2003 | Huang .......................... 385/92 |
| 2003/0198025 A1 | 10/2003 | Cao ............................ 361/728 |
| 2003/0198029 A1 * | 10/2003 | Zaremba ..................... 361/752 |
| 2003/0206403 A1 * | 11/2003 | Zaremba ..................... 361/728 |
| 2003/0214789 A1 | 11/2003 | Medina et al. .............. 361/729 |
| 2004/0185696 A1 * | 9/2004 | Long et al. .................. 439/160 |
| 2005/0003696 A1 * | 1/2005 | Shirk et al. ................. 439/352 |

FOREIGN PATENT DOCUMENTS

WO WO01/52362 A1 7/2001

OTHER PUBLICATIONS

U.S. Appl. No. 60/456,361.*
Product Data Sheet, SFP Transceiver for Gigabit Ethernet / Fibre Channel, HTR 6534 Series, Hitachi Cable Ltd., dated Mar. 2003. Retrieved from http://www.hitachi-cable.co.jp/ICSFiles/afieldfile/2005/08/18/HTR6534.pdf.*
Optical Components, CAT.NO.EN-220A, dated 2004 (month unknown). Retrieved from http://www.hitachi-cable.co.jp/catalog/EN-220.pdf.*

(Continued)

*Primary Examiner*—Mike Stahl
(74) *Attorney, Agent, or Firm*—Workman Nydegger

(57) ABSTRACT

A transceiver module is configured for insertion within a cage. The cage has a cage latch that retains the transceiver module in the cage. The transceiver module has a housing configured to receive any one of at least two different release mechanisms. Each of the release mechanisms is movable between a first position and a second position, wherein the cage latch is not deflected when the release mechanism is in the first position, and wherein the cage latch is deflected when the release mechanism is in the second position such that the transceiver module can be removed from the cage.

18 Claims, 7 Drawing Sheets

OTHER PUBLICATIONS

Product Change Notice PCN A02-001-476242-0B, Agilent Technologies, dated Aug. 2002. Retrieved from http://www.avagotech.com/assets/downloadDocument.do?id=431.*

Agilent Technologies et al., "Small Form-factor Pluggable (SFP) Tranceiver Multisource Agreement (MSA)" "Cooperation Agreement for Small Form-Factor Pluggable Transceivers" p. 1-38, Sep. 14, 2000.

* cited by examiner

DUAL CONFIGURATION TRANSCEIVER HOUSING

BACKGROUND OF THE INVENTION

This invention relates to a pluggable transceiver module for use in a fiber optic switch.

Fiber optics are increasingly used for transmitting data signals. Typically, when data is transmitted by an optical network, it must be converted from an electrical signal to a light signal, and visa versa. In order to effectuate the conversion between electrical and optical signals, a transceiver module is used at both ends of a fiber optic cable. Each transceiver module typically contains a laser transmitter circuit capable of converting electrical signals to optical signals, and an optical receiver capable of converting received optical signals back into electrical signals.

Typically, a transceiver module is electrically interfaced with a host device, such as a host computer, switching hub, network router, switch box, computer I/O or the like. In many applications it is desirable for the transceiver modules to be "hot-pluggable," that is, the transceiver module may be inserted into and removed from the host system without removing electrical power. In this way, if a transceiver module fails, it can more readily be removed from the host device and replaced with a new module without soldering or the like.

Consequently, several pluggable transceiver module designs and standards have been introduced in which a pluggable transceiver module plugs into a receptacle which is electronically connected to a host circuit board. For example, such a standard is delineated in the Small Form-Factor Pluggable (SFP) Transceiver Multi-Source Agreement (MSA), dated Sep. 14, 2000. Such standards define a receptacle or cage that receives a transceiver module. The cage includes a cage latch. The transceiver module includes a latch boss which fits into the cage latch. The transceiver module also includes an actuator configured to engage the cage latch and deflect the cage latch away from the latch boss, thereby releasing the transceiver module from the cage. An exposed feature of the transceiver module is color coded to indicate if the transceiver module is multi-mode or single mode.

Although various standards have been given for the configuration of the transceiver module and the cage, variations between manufacturers exist as to some of the specific dimensions and configurations. The variations between manufacturers are sometimes intended to satisfy different end-user requirements, such as how the transceiver is extracted from the cage. Consequently, it is desirable to have transceiver and cage designs that are easily adapted to different configurations without requiring different tooling, molds, components, etc., to construct the desired configuration. A transceiver that is readily adaptable to different configurations would be an improvement to the art.

SUMMARY OF THE INVENTION

A transceiver module is configured for insertion within a cage. The cage has a cage latch that retains the transceiver module in the cage. The transceiver module comprises a housing configured to receive any one of at least two different release mechanisms. Each of the release mechanisms is movable between a first position and a second position, wherein the cage latch is not deflected when the release mechanism is in the first position, and wherein the cage latch is deflected when the release mechanism is in the second position such that the transceiver module can be removed from the cage.

DESCRIPTION OF THE PREFERRED EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
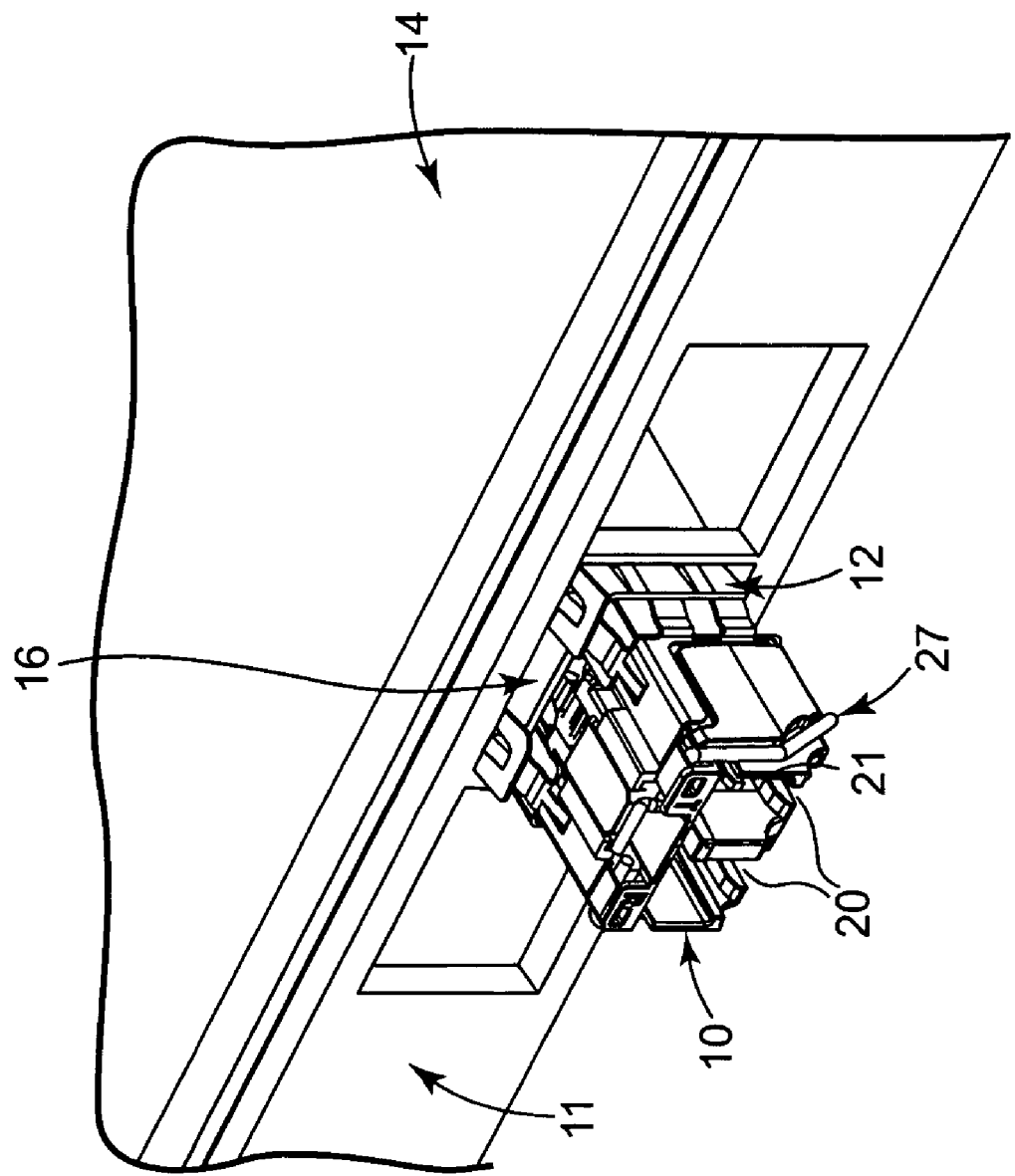
FIG. 1 is a perspective illustration of a transceiver module in accordance with the present invention plugged into a cage mounted on a printed circuit board.

FIG. 1 illustrates transceiver module 10, face plate 11, cage 12, and printed circuit board (PCB) 14 in accordance with the present invention. Cage 12 is shown mounted to PCB 14. Cage 12 can be secured to PCB 14 in various ways consistent with present invention. Face plate 11 is fixed to PCB 14 and typically includes a plurality of openings. Cage 12 is illustrated extending through one of the openings in face plate 11. Cage 12 may be further secured to faceplate 11 with outwardly-extending prongs or springs or the like. Only a single cage 12 is illustrated extending through faceplate 11 for ease of illustration, but one skilled in the art will recognize that a multiplicity of cages can be mounted to PCB 14 and extend through faceplate 11 to receive a multiplicity of transceivers in accordance with the present invention.

Cage 12 includes cage latch 16. In FIG. 1, transceiver module 10 is shown inserted into cage 12 and secured by cage latch 16. Cage latch 16 is resiliently biased to move toward transceiver module 10 thereby securing transceiver module 10 within cage 12. Cage latch 16 can also be moved away from transceiver module 10 so that transceiver module 10 can be extracted from cage 12, as will be described in more detail below.

Transceiver module 10 includes input/output receptacles 20 in its front face 21. Input/output receptacles 20 may be used to provide both input and output for optical and electrical signals to and from transceiver module 10. In other embodiments, one or more input/output receptacle 20 may be used. Front face 21 of transceiver module 10 is referred to as being at the front of transceiver module 10. However, in this regard, such directional terminology is used with reference to the orientation of the Figures being described and is in no way meant to be limiting. One skilled in the art will recognize that components of embodiments of the present invention can be positioned in a number of different orientations.

In operation, optical and electrical signals can be transmitted to and from a destination or source that is plugged into input/output receptacles 20 to transceiver module 10. When transceiver module 10 is plugged into cage 12, it is in electrical communication with PCB 14 via the connections therebetween. Thus, signals can be sent to and from the PCB via transceiver module 10. Transceiver module 10 is hot pluggable and may be removed from cage 12 and replaced.

Figure 2:
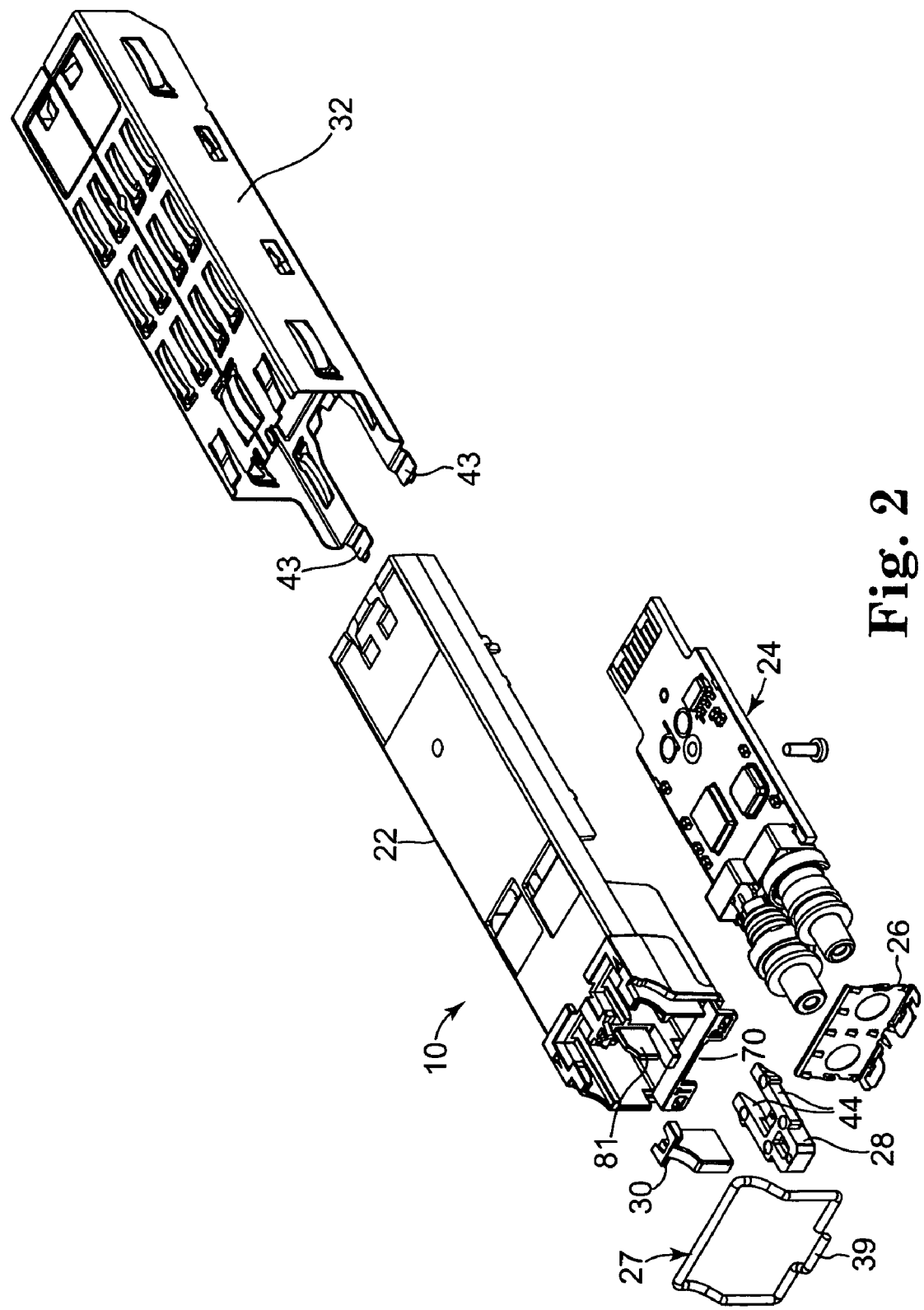
FIG. 2 is an exploded perspective illustration of the transceiver module.

FIG. 2 illustrates an exploded isometric view of the top-front side of a first configuration of transceiver module 10. Transceiver module 10 includes housing 22 which receives transceiver opto-electronic components 24 and electromagnetic interference (EMI) shield 26. In the first configuration of transceiver module 10, release handle 27 and actuator wedge 28 are attached to housing 22 in manners described in greater detail below. A mode indicator button 30 is attached to housing 22 to indicate the particular mode of transceiver module 10. Module cover 32 is configured to fit over housing 22 of transceiver module 10 and protects opto-electronic components 24. Module cover 32 also helps secure module 10 in cage 12 when it is inserted therein, and also helps secure release handle 27 and actuator wedge 28 to housing 22.

In one embodiment, housing 22 is formed of a die cast or molded conductor, such as metal or conductive plastic, while module cover 32 is formed from stamped and shaped sheet metal. Release handle 27 is formed of shaped wire, while wedge 28 and mode indicator button 30 are formed of a plastic material.

In a second configuration of transceiver module 10, the same housing 22, opto-electronic components 24, EMI shield 26, mode indicator button 30 and module cover 32 are utilized, but release handle 27 and actuator wedge 28 are omitted from transceiver module 10. In this manner, different end-user configuration requirements for the transceiver module 10 can be satisfied with common components. In particular, housing 22 can be used for at least two different transceiver module configurations.

Figure 3:
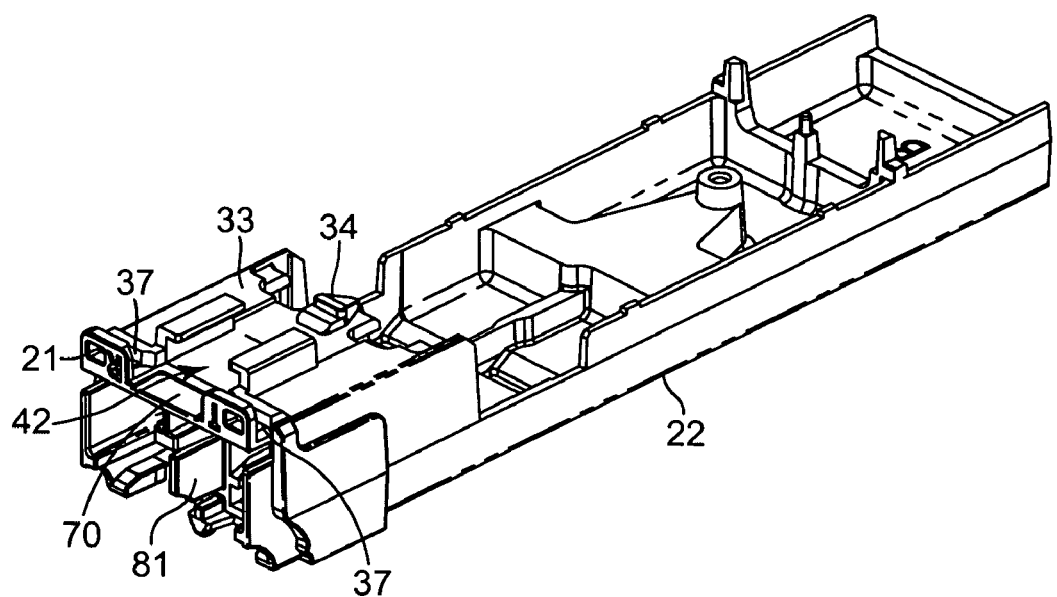
FIG. 3 is a perspective illustration of the housing of the transceiver module.
Figure 4:
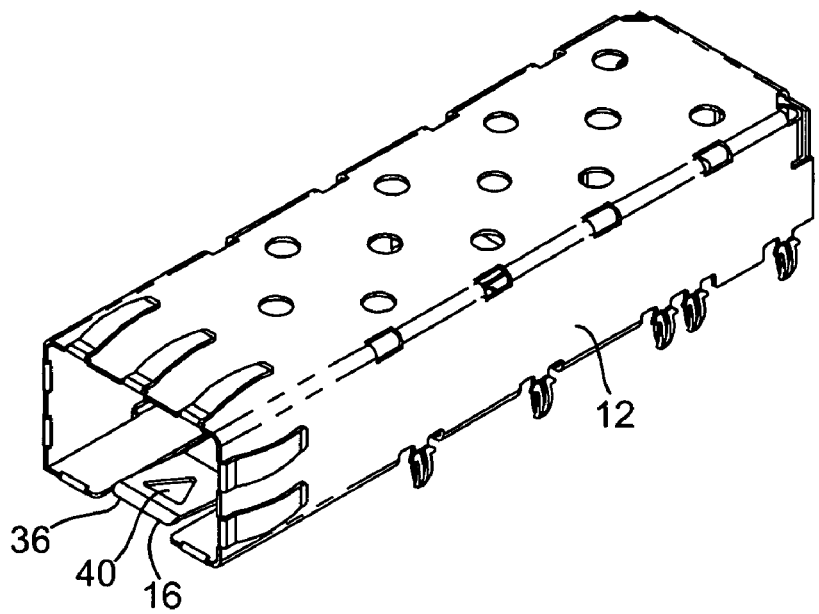
FIG. 4 is a perspective illustration of the cage for receiving the transceiver module.

As best seen in FIG. 3, the bottom side of housing 22 provides a surface 33. A latch boss 34 extends away from surface 33 such that the top of latch boss 34 is raised relative to surface 33. Latch boss 34 extends away from surface 33 and is configured to engage cage latch 16 of cage 12 (best seen in FIG. 4). Specifically, when transceiver module 10 is inserted into cage 12, latch boss 34 deflects latch 16 slightly away from transceiver module 10 such that latch boss 34 travels past the front edge 36 of latch 16 and toward latch slot 40 in latch 16. When transceiver module 10 is fully inserted into cage 12, latch boss 34 is aligned with latch slot 40 such that latch boss 34 extends through latch slot 40. Latch 16 is configured with a bias such that when latch boss 34 is fully aligned with latch slot 40, latch 16 transitions toward transceiver module 10. In this way, transceiver module 10 will be locked into cage 12.

In one embodiment, latch boss 34 and latch slot 40 are configured to be triangular in shape and complement each other such that latch boss 34 fits through latch slot 40. Although latch slot 40 is specified as triangular in shape in the above-referenced Small Form-Factor Pluggable Transceiver Multi-Source Agreement, latch boss 34 and latch slot 40 may have shapes other than the triangular shape illustrated in the Figures. The shapes of latch boss 34 and latch slot 40 may be the same (i.e., both triangular, rectangular, circular, etc.), or may be different, so long as latch slot 40 is capable of securely engaging latch boss 34.

Figure 5:
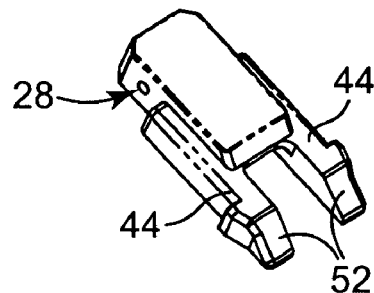
FIG. 5 is an enlarged perspective view of the actuator wedge used in one configuration of the transceiver module.

In the first configuration of transceiver module 10, release handle 27 is mounted in trough 37 or similar openings on housing 22. Handle 27 is mounted in trough 37 such that it can be rotated relative to transceiver module 10. Release handle 27 includes cam portion 39. As described in greater detail below, when handle 27 is rotated, cam portion 39 engages actuator wedge 28 and causes wedge 28 to move away from front face 21 of transceiver module 10. In one embodiment (best seen in FIG. 5), tab portions 43 of module cover 32 trap handle 27 within trough 37 when module cover 32 is installed on housing 22.

In the first configuration of transceiver module 10, actuator wedge 28 (seen in FIGS. 2, 5 and 6) is slidably retained in a slot (shown as T-slot 42) that is provided on surface 33. Slot 42 is configured to retain actuator wedge 28 such that wedge 28 can move toward and away from the front side 21 of transceiver module 10, but so that it cannot move laterally. The engaging shapes of actuator wedge 28 and slot 42 may differ from the T-shape illustrated, so long as slot 42 retains actuator wedge 28 adjacent surface 33 and permits wedge 28 to move toward and away from the front side 21 of transceiver module 10, but constrains lateral movement of actuator wedge 28.

Actuator wedge 28 includes tines 44 spaced to accommodate latch boss 34 therebetween, such that when latch boss 34 is placed between tines 44, as illustrated in the Figures and described in greater detail below, linear movement of wedge 28 (in the direction of arrow 45 in FIG. 6) will not be impeded by latch boss 34 as wedge 28 moves away from the front face 21 of transceiver module 10. Tines 44 of wedge 28 are configured with ramp portions 52. As wedge 28 moves away from the front face 21 of transceiver module 10, ramp portions 52 of tines 44 engage latch 16 of cage 12 and deflect latch 16 away from surface 33 of module 10. Ramp portions 52 are illustrated as having a generally linear slope, but can also be designed with non-linear slopes.

To extract transceiver module 10 from cage 12, cage latch 16 must be moved away from surface 33 of transceiver module 10 a sufficient distance so that that latch slot 40 is removed from engagement with latch boss 34 and latch boss 34 clears the front edge 36 of latch slot 40, as will be described more fully below.

Figure 6:
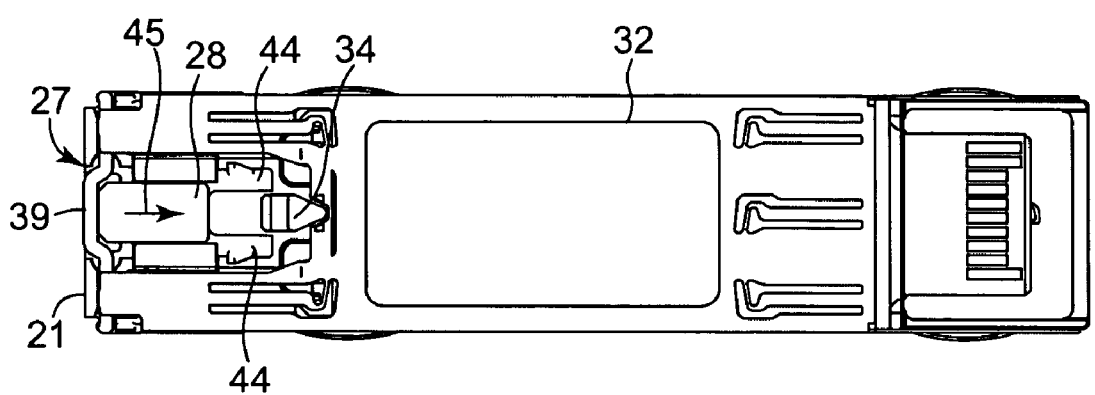
FIG. 6 is a bottom plan illustration of the assembled transceiver module.
Figure 7:
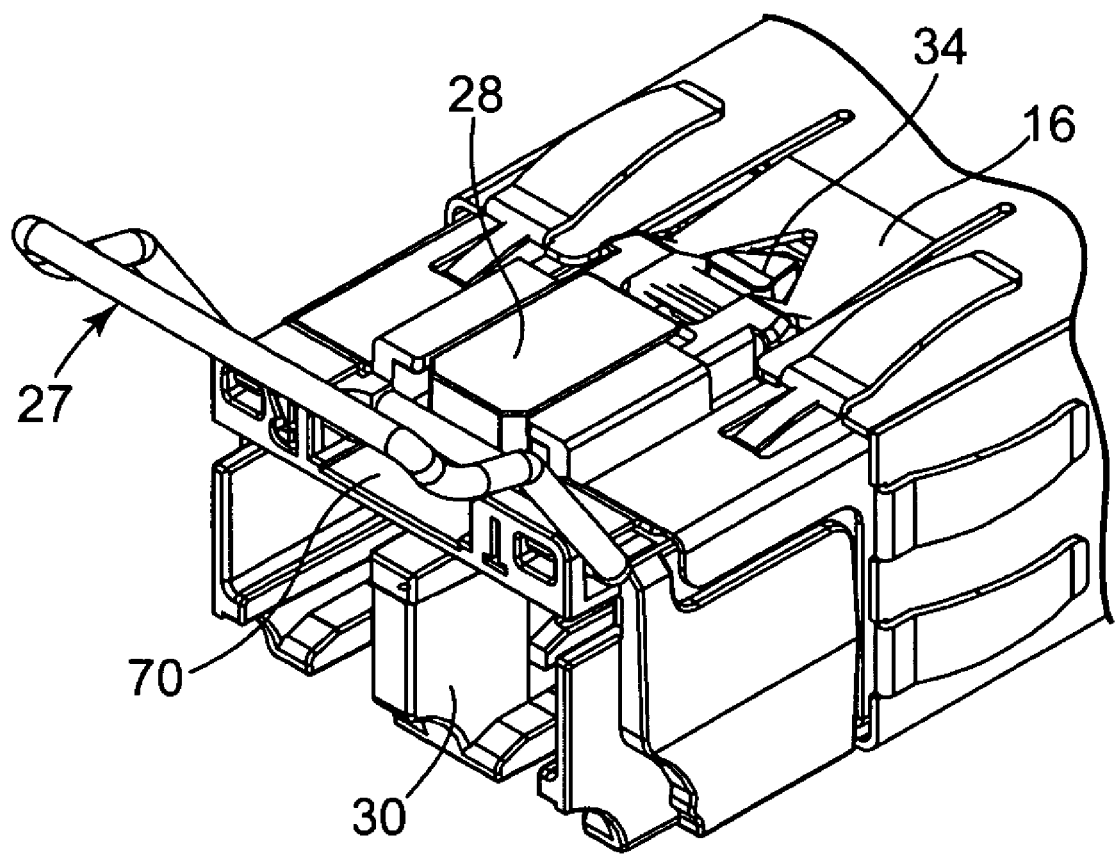
FIG. 7 is a perspective illustration of a release handle being used to remove the transceiver module from the cage.

In the configuration of transceiver module 10 having release handle 27 and actuator wedge 28, the release handle 27 can be used to release transceiver module 10 from cage 12 so that it can be extracted therefrom. In FIGS. 1 and 6, release handle 27 is shown in a closed or 0° position, such that it is generally parallel with the front face 21 of transceiver module 10. In one embodiment, cam portion 39 of release handle 27 does not engage wedge 28 when release handle 27 is in the closed postion. As release handle 27 is rotated from the initial closed position toward a second open position (best seen in FIG. 7), cam portion 39 moves away from the front of transceiver module 10 with the rotation, thereby engaging actuator wedge 28 and causing actuator wedge 28 to move in an approximately linear direction within slot 42 away from the front face 21 of transceiver module 10 with the rotation of release handle 27.

As wedge 28 moves away from front surface 21, ramp portions 52 of wedge 28 engage cage latch 16 and deflect latch 16 away from surface 33 of transceiver module 10 and consequently away from latch boss 34. In this way, the movement of wedge 28 against latch 16 pushes latch 16 off latch boss 34 and provides clearance for latch boss 34 to pass out of latch slot 40. Once adequate clearance is provided, transceiver module 10 can be removed from cage 12, such as by pulling on handle 27.

Figure 8A:
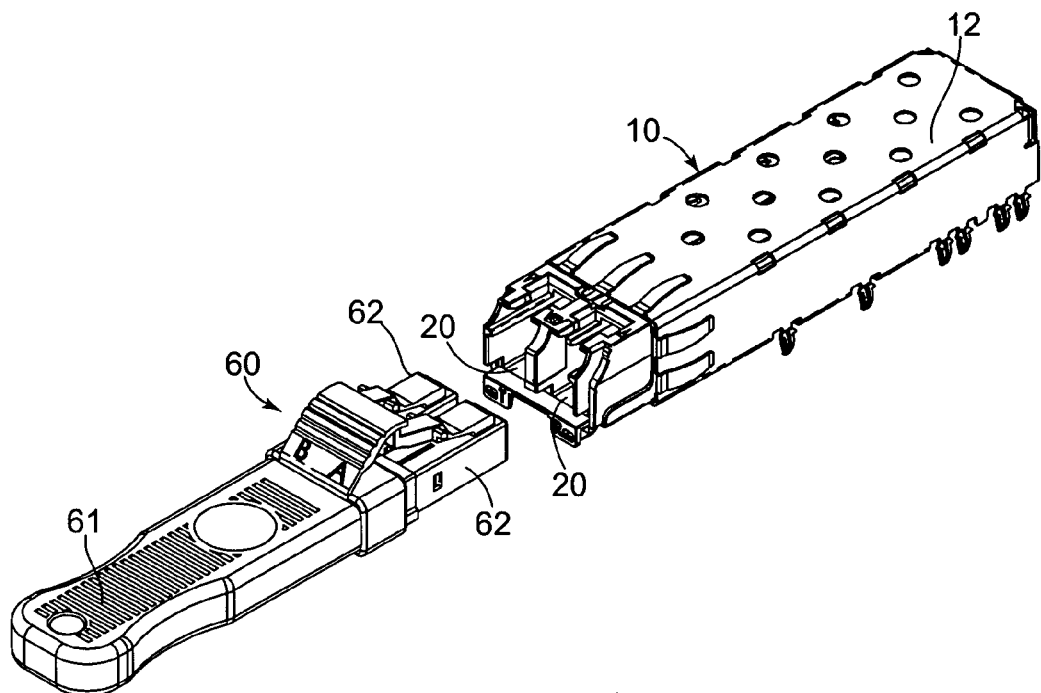
FIGS. 8A and 8B are perspective illustrations of a release tool used to remove the transceiver module from the cage.
Figure 8B:
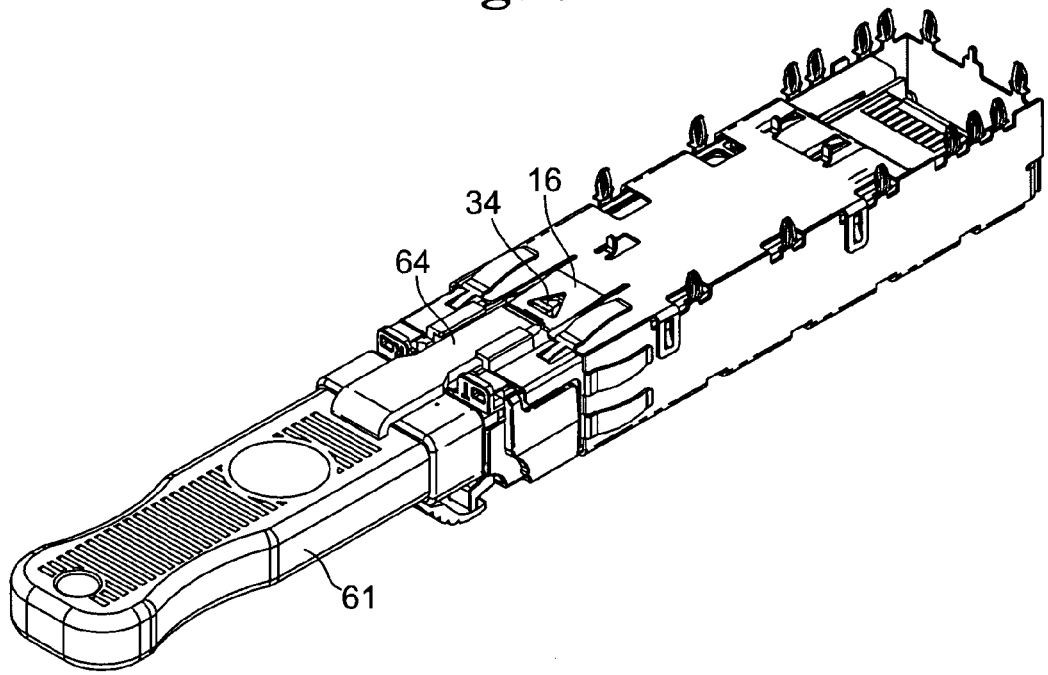

In the configuration of transceiver module 10 in which release handle 27 and wedge 28 are not present, release tool 60 (illustrated in FIGS. 8A and 8B) can be used to release transceiver module 10 from cage 12 so that it can be extracted therefrom. Release tool 60 includes a handle portion 61 having connector engagement elements 62 at one end thereof. Engagement elements 62 are configured to engage receptacles 20 of transceiver module 10. Actuator arm 64 extends past connector engagement elements 62 and is shaped to approximately resemble wedge 28 at its distal end 66. Accordingly, similar reference numbers are used herein to designate similar parts. As described above with respect to wedge 28, when actuator arm 64 is actuated, such as by inserting the tool, ramp portion(s) 52 engages latch 16 of cage 12 and deflect latch 16 away from surface 33 of module 10.

To remove transceiver module 10 using release tool 60, actuator arm 64 is inserted through gap or opening 70 in front face 21 of housing 22. Opening 70 is sized to receive actuator arm 64 and permit actuator arm 64 to pass unimpeded through slot 42. From this first position, as removal tool 60 is advanced toward transceiver module 10, connector engagement elements 62 engage receptacles 20, and ramp portions 52 of actuator arm 64 engage cage latch 16. Ramp portion(s) 52 deflect latch 16 away from surface 33 of transceiver module 10 and consequently away from latch boss 34 to provide clearance for latch boss 34 to pass out of latch slot 40. Once actuator arm 64 of removal tool 60 is fully inserted and adequate clearance is provided, transceiver module 10 can be removed from cage 12, such as by pulling on handle portion 61 of removal tool 60.

Actuator arm 64 of removal tool 60 is illustrated as spatially fixed with respect to handle portion 61 and connector engagement elements 62, such that connector engagement elements 62 engage receptacles 20 of transceiver module 10 concurrent with the engagement of actuator arm 64 and latch 16. In other embodiments, actuator arm 64 may be movable with respect to handle portion 61 and connector engagement elements 62, such that connector engagement elements 62 engage receptacles 20 of transceiver module 10 prior to the engagement of actuator arm 64 and latch 16.

Figure 9A:
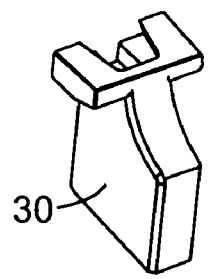
FIGS. 9A and 9B are enlarged perspective views of the mode indicator button used with the transceiver module.
Figure 9B:
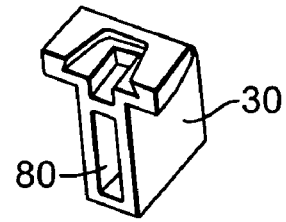

Typically, fiber optic components use color to designate mode (e.g., wavelength, contact type, product type, etc.). Transceiver module 10 is generally small and only a small portion of transceiver module 10 is visible when installed in cage 12. Mode indicator button 30 (FIGS. 2, 9A and 9B) provides a highly visible color signal adjacent the front face 21 of transceiver module 10, and is visible from the front and top of transceiver module 10. Mode indicator button 30 is a molded plastic button (in any desired color) that is integral to the fiber optic input/output receptacles 20 of transceiver module 10, thereby clearly providing mode information to a user and adding no size to transceiver module 10. In one embodiment, mode indicator button 30 includes a recessed portion 80 in its back surface that is shaped to receive protrusion 81 of housing 22. Mode indicator button 30 may be secured to protrusion 81 by means including press fit and adhesive. In another embodiment, the positions of recessed portion 80 and protrusion 81 may be switched such that mode indicator button 30 has a protrusion receivable in a recessed portion of housing 22.

Mode indicator button 30 can be used to designate transceiver module 10 optical mode information, or in specific applications can be used by the end-user to designate user specific information. Mode indicator button 30 provides several advantages over previous color marking features, such as color coded molded handles. For example, mode indicator button is easily assembled for different mode configurations, adds no size to the transceiver module, and allows the use of either a handle 27 or a removal tool 60 to release the transceiver module 10 from cage 12. Previous color marking features, such as color coded molded handles, are obviously of no advantage in a transceiver module with no handle.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electro-mechanical, and electrical arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A transceiver module for insertion within a cage having a cage latch that retains the transceiver module in the cage, the transceiver module comprising:

a housing configured to receive any one of at least two different release mechanisms, a first one of which comprises a tool configured to releasably engage the housing, each of the release mechanisms movable between a first position and a second position, wherein the cage latch is not deflected when the release mechanism is in the first position, and wherein the cage latch is deflected by a ramped surface on an actuator coupled to the release mechanism when the release mechanism is in the second position such that the transceiver module can be removed from the cage; and a module cover that encloses a substantial portion of the housing, wherein a second release mechanism of the at least two different release mechanisms is a handle rotatably mounted to the transceiver module, and wherein the actuator moves linearly to deflect the cage latch as the handle is rotated, and wherein the module cover retains the handle to the housing.

2. The transceiver module of claim 1, further comprising a projection extending from the housing and configured to engage the cage latch.

3. The transceiver module of claim 2, wherein the cage latch has a slot through which the projection projects when at least one of the release mechanisms is in the first position and wherein the projection is removed from the slot when the at least one release mechanism is in the second position.

4. The transceiver module of claim 1, wherein the housing includes a first opening to receive a first of the at least two different release mechanisms, and a second opening to receive a second of the at least two different release mechanisms.

5. The transceiver module of claim 1, wherein the housing can receive only one of the at least two different release mechanisms at the same time.

6. A data transmission system comprising:
a printed circuit board; and
the transceiver module according to claim 1.

7. The transceiver module of claim 6, wherein the housing includes a first opening to receive a first of the at least two different release mechanisms, and a second opening to receive a second of the at least two different release mechanisms.

8. The transceiver module of claim 1, wherein at least one of the release mechanisms is configured to deflect the cage latch using a rotational motion and another at least one of the release mechanisms is configured to deflect the cage latch using a non-rotational motion.

9. A transceiver module housing comprising:
a body having an interface surface and a front side;
a first opening adjacent the front side of the interface surface, the first opening configured to receive a first release mechanism, wherein the first opening includes a trough that is configured to receive a rotatable handle and the rotatable handle is retained in the trough by a module cover; and
a second opening adjacent the front side of the interface surface and distinct from the first opening, the second opening configured to receive a second release mechanism different from the first release mechanism, the second release mechanism comprising a tool configured to releasably engage the housing.

10. The transceiver module housing of claim 9, wherein the second opening is configured to receive one or the other of the first and second release mechanisms but not both release mechanisms at the same time.

11. A transceiver module for insertion within a cage having a cage latch that retains the transceiver module in the cage, the transceiver module comprising:
a housing configured to receive any one of at least two different release mechanisms, a first one of which comprises a tool configured to releasably engage the housing, each of the release mechanisms movable between a first position and a second position, wherein the cage latch is not deflected when the release mechanism is in the first position, and wherein the cage latch is deflected when the release mechanism is in the second position such that the transceiver module can be removed from the cage,
wherein the housing includes first and second fiber optic input/output receptacles that are each sized and configured to receive a respective connector engagement element of the tool.

12. The transceiver module of claim 11, wherein a second release mechanism of the at least two different release mechanisms comprises a handle rotatably mounted to the housing.

13. The transceiver module of claim 11, further comprising an actuator coupled to at least one of the release mechanisms, the actuator having a ramped surface for deflecting the cage latch when the at least one release mechanism is in the second position.

14. The transceiver module of claim 13, wherein the at least one release mechanism is a second one of the release mechanisms and wherein the second release mechanism includes a handle rotatably mounted to the transceiver module, and wherein the actuator moves linearly to deflect the cage latch as the handle is rotated.

15. The transceiver module of claim 13, wherein the at least one release mechanism is the first release mechanism and the release tool comprised in the first release mechanism is linearly insertable into the transceiver module, and wherein the actuator moves linearly to deflect the cage latch as the release tool is inserted.

16. A data transmission system comprising:
a printed circuit board; and
the transceiver module according to claim 11.

17. The transceiver module of claim 11, further comprising a projection extending from the housing and configured to engage the cage latch,
wherein the cage latch has a slot through which the projection projects when at least one of the release mechanisms is in the first position and wherein the projection is removed from the slot when the at least one release mechanism is in the second position.

18. The transceiver module of claim 11, wherein at least one of the release mechanisms is configured to deflect the cage latch using a rotational motion and another at least one of the release mechanisms is configured to deflect the cage latch using a non-rotational motion.

* * * * *

UNITED STATES PATENT AND TRADEMARK OFFICE
CERTIFICATE OF CORRECTION

| | |
|---|---|
| PATENT NO. | : 7,625,135 B2 |
| APPLICATION NO. | : 10/758734 |
| DATED | : December 1, 2009 |
| INVENTOR(S) | : David R. Dodds |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1203 days.

Signed and Sealed this

Twenty-sixth Day of October, 2010

David J. Kappos
*Director of the United States Patent and Trademark Office*